US012734947B2

(12) United States Patent
Baisch et al.

(10) Patent No.: US 12,734,947 B2
(45) Date of Patent: Sep. 15, 2026

(54) ATTACHMENT OF COMFORT SYSTEM TO A TRIM COVER

(71) Applicant: LEAR CORPORATION, Southfield, MI (US)

(72) Inventors: Ashley Baisch, Wasington Township, MI (US); Timothy M. Cloutier, Clawson, MI (US); Samuel Blair, Rochester, MI (US)

(73) Assignee: LEAR CORPORATION, Southfield, MI (US)

( * ) Notice: Subject to any disclaimer, the term of this patent is extended or adjusted under 35 U.S.C. 154(b) by 283 days.

(21) Appl. No.: 18/418,596

(22) Filed: Jan. 22, 2024

(65) Prior Publication Data

US 2025/0236228 A1 Jul. 24, 2025

(51) Int. Cl.
*B60N 2/90* (2018.01)
*B60N 2/56* (2006.01)

(52) U.S. Cl.
CPC ............... *B60N 2/914* (2018.02); *B60N 2/56* (2013.01)

(58) Field of Classification Search
CPC .......... B60N 2/90; B60N 2/56; B60N 2/5621; B60N 2/58; B60N 2/5816; B60N 2/914
See application file for complete search history.

(56) References Cited

U.S. PATENT DOCUMENTS 5,826,937 A * 10/1998 Massara ................... B60N 2/80 297/284.6
6,332,651 B1 * 12/2001 Horisawa ............... A47C 7/742 297/219.1
7,727,171 B2 * 6/2010 Ozaki .................... B60N 2/976 601/149
9,333,889 B1 * 5/2016 Cloutier ................... B60N 2/70
10,369,074 B2 * 8/2019 Oberg .................. A61H 9/0078
10,576,855 B2 * 3/2020 Dörfler .................. B60N 2/914
10,899,255 B2 * 1/2021 Mizoi ...................... B60N 2/99
11,364,831 B2 * 6/2022 Ceglarek ................ B60N 2/914
12,012,025 B2 * 6/2024 Fitzpatrick ............. B60N 2/976
2003/0038517 A1 * 2/2003 Moran .................. B60N 2/914 297/284.6
2008/0136142 A1 6/2008 Welch et al.
2014/0265491 A1 * 9/2014 Galbreath ............. B60N 2/914 297/284.1
2017/0217345 A1 8/2017 Tobata et al.
2018/0065517 A1 * 3/2018 Kuhley ................. A61H 23/02
2019/0106033 A1 4/2019 Nishimoto et al.
2021/0300224 A1 * 9/2021 Tait .......................... B60N 2/56
2025/0020148 A1 1/2025 Takahashi

FOREIGN PATENT DOCUMENTS

WO 2023244721 A1 12/2023

OTHER PUBLICATIONS

International Search Report and Written Opinion for PCT/US2025/011970 mailed Mar. 26, 2025.

* cited by examiner

*Primary Examiner* — Chi Q Nguyen
(74) *Attorney, Agent, or Firm* — Carlson, Gaskey & Olds, P.C.

(57) ABSTRACT

A comfort system comprises at least a first comfort member and a second comfort member attached to the first comfort member. At least one of the first comfort member and the second comfort member includes a plurality of connectors. A trim cover includes a plurality of apertures, and the comfort system is securable to the trim cover as a unit via at least one connector being inserted through at least one aperture.

20 Claims, 5 Drawing Sheets

70
24
28
58
34
32
56
26
34
32
64
34
60
62
66
40

28

28
34
66
64
62
32
24
60

24
62
60
34
32
22
66
64

60
64
24

62
34
66
32
72
68

ATTACHMENT OF COMFORT SYSTEM TO A TRIM COVER

BACKGROUND

Comfort systems that include massage assemblies and thermal members, for example, can be associated with a seat. Trim covers can also be associated with such systems.

DETAILED DESCRIPTION

Figure 1:
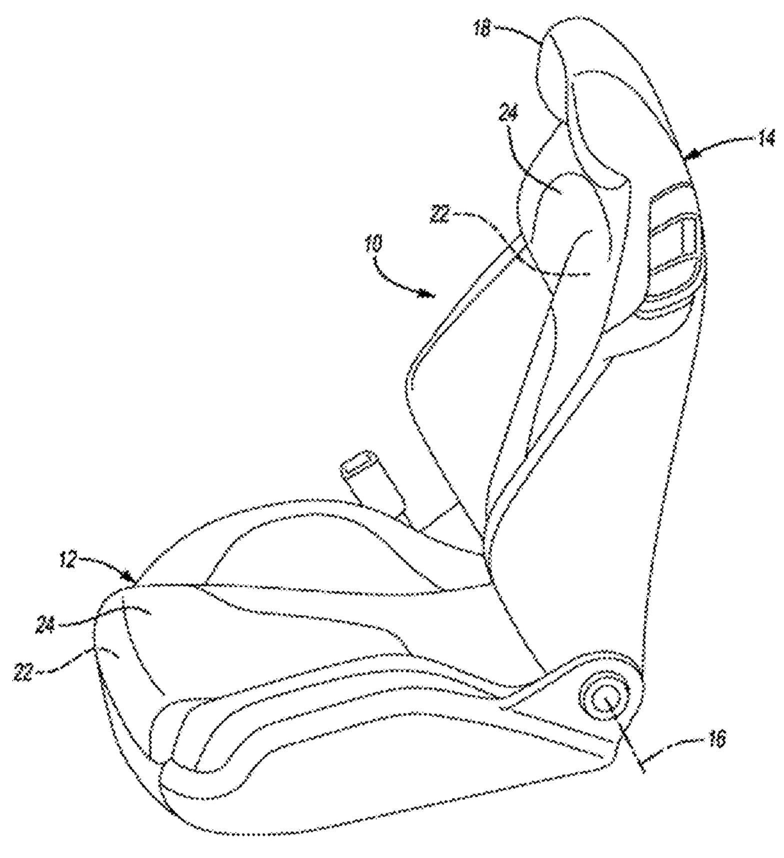
FIG. 1 shows an example seat assembly with a trim cover.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

It should be understood that terms such as "about," "substantially," and "generally" are not intended to be boundaryless terms, and should be interpreted consistent with the way one skilled in the art would interpret those terms.

The subject disclosure is directed to an integrated connector that connects a comfort system to a trim cover as a unit.

FIG. 1 illustrates a seat assembly 10 according to one example embodiment. The seat assembly 10 may be utilized as a vehicle seat assembly 10 for seating in a vehicle, such as an automobile, an aircraft, a watercraft, or any other seating environment. The seat assembly 10 includes a seat bottom 12, which may be adapted to be mounted for motor-driven adjustable translation in a fore and aft direction and in an up and down direction of a vehicle. The seat assembly 10 includes a seat back 14, which may be pivotally connected to the seat bottom 12 to extend generally upright relative to the seat bottom 12 for pivotal adjustment about an axis 16 relative to the seat bottom 12. It should be understood that this is just one example of a seat configuration, and that other configurations could also be utilized.

The seat back 14 may include a head restraint 18 that may be configured to support the head of a seat occupant. The head restraint 18 may be disposed at the top of the seat back 14. The head restraint 18 may be unitary with the seat back 14 or may be a separate component that is adjustably positionable with respect to the top of the seat back 14. The seat bottom 12 may be configured to support a seat occupant. In a vehicular application, the seat bottom 12 may be mounted to a support surface, such as a vehicle floor.

The seat back 14 and the seat bottom 12 may each have at least one seat component 20 and a cushion 22. The seat component 20 may be secured to the cushion 22 with one or more retention clips as will be discussed in more detail below. In one example, the seat component 20 comprises a trim cover 24 that may be disposed over or upon the cushion 22. The trim cover 24 provides at least a portion of a visible exterior surface of the seat assembly 10. The trim cover 24 may include a plurality of trim panels that may be assembled in any suitable manner, such as by stitching. The trim panels may be made of any suitable material or materials, such as fabric, leather, vinyl, or combinations thereof.

Figures 2A, 2B, 3:
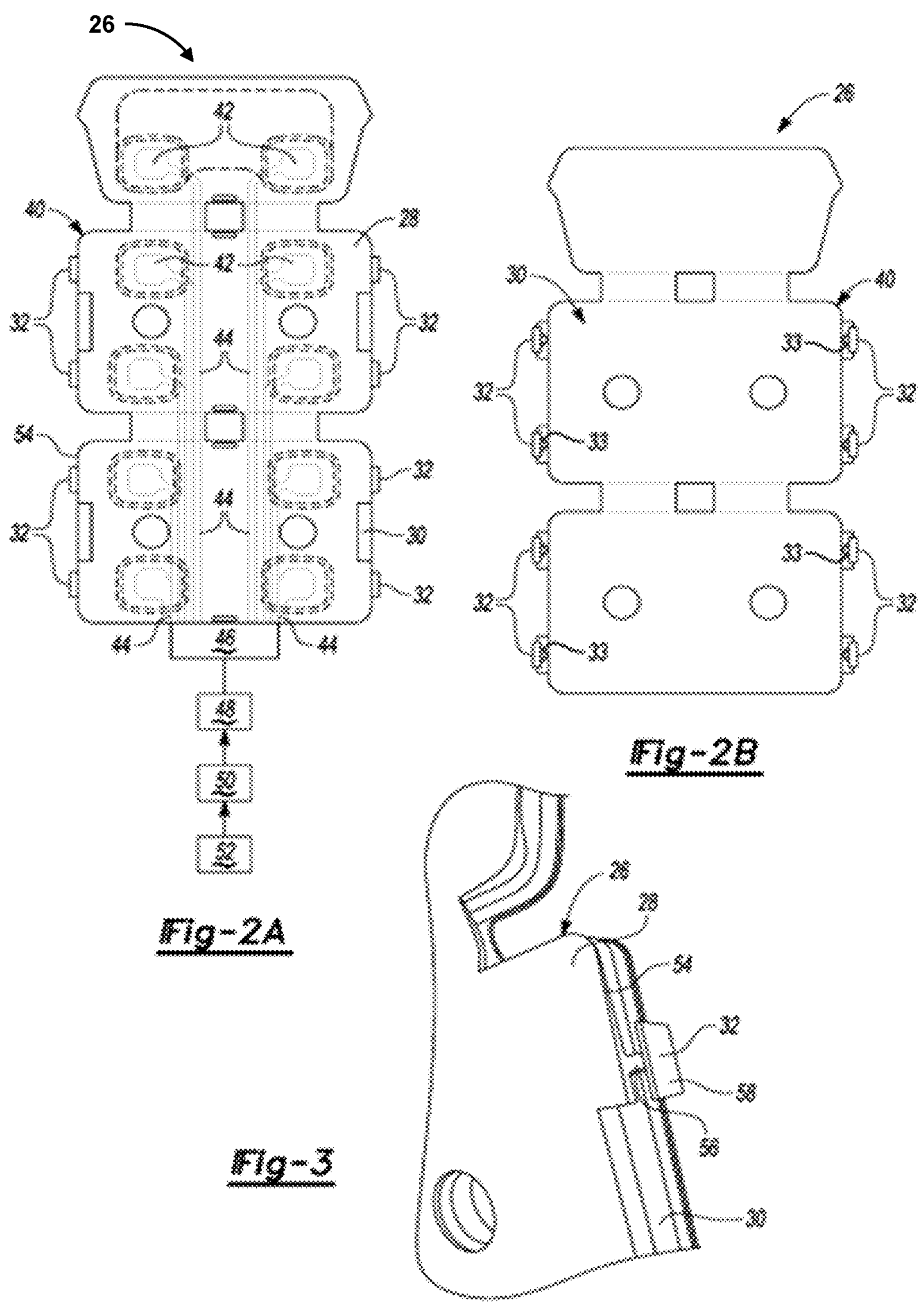
FIG. 2A is a top view of one side of a comfort system showing an inflatable massage sheet.
FIG. 2B is a top view of an opposite side of the comfort system of FIG. 2A which includes a variable temperature member.
FIG. 3 is an enlarged perspective view of a connector that is integrally formed as part of the inflatable massage sheet.

FIGS. 2A-2B show an example of a comfort system 26 with integrated connectors that attach the comfort system 26 to the trim cover 24 as a unit. In one example, the comfort system 26 comprises at least a first comfort member 28 and a second comfort member 30 attached to the first comfort member 28, wherein at least one of the first comfort member 28 and the second comfort member 30 includes a plurality of connectors. In one example, the plurality of connectors comprise a plurality of integrally formed connectors 32 as shown. In another example, the connectors could be subsequently welded or attached to the assembly prior to attaching the assembly to the trim cover. For example, the connectors could be part of a strip or other supporting structure that is attached to the assembly at the same time the comfort members are mechanically attached to each other. The trim cover 24 includes a plurality of apertures 34 (FIG. 4A), and the comfort system 26 is securable to the trim cover 24 as a unit via at least one connector 32 being inserted through at least one aperture 34. The unit thus comprises a modular sub-assembly of comfort system members that are assembled together.

The comfort system 26 is concealed by or disposed under the trim cover 24 and is disposed on the cushion 22. In one example, the comfort system 26 comprises one or more of: a temperature adjusting device like a heating pad or heating mat; an inflatable device for enhancing comfort of a seat occupant, such as a lumbar support; an inflatable device that provides massage functionality; and an air-permeable material that facilitates airflow for a ventilated seat, or the like.

In one example, the first comfort member 28 comprises an inflatable sheet (FIG. 2A) that provides a massage function and the second comfort member 30 comprises a variable temperature comfort pad or mat 30 (FIG. 2B). In one example, the inflatable sheet 28 comprises one or more layers of material integrally formed together as a single piece structure that includes a plurality of bladders and associated pneumatic circuits, e.g., tubing or conduits, that define fluid flow paths, e.g., pneumatic routes, that connect each bladder to an air source. In one example, the sheet 28 comprises a Thermoplastic Polyurethane (TPU) material.

In one example, the plurality of integrally formed connectors 32 are formed as part of the sheet 28. As such, the sheet 28 and connectors 32 are formed as a one-piece, monolithic structure. In one example, the variable temperature comfort pad or mat 30 comprises one or more sheets of material with thermal elements that are controllable to vary temperature. The variable temperature comfort mat 30 and the inflatable sheet 28 are attached to each other form a unit 40. In one example, the variable temperature comfort mat 30 includes a set of apertures 33 that align with the apertures 34 in the trim cover, and the connectors 32 are inserted through the apertures 33 in the mat 30 to secure the mat and the sheet together as shown in FIG. 2B. In one example, the variable temperature comfort mat 30 is adhered or otherwise fastened/attached to one side of the sheet 28.

In one example, the plurality of connectors 32 comprise attachment tabs, t-tabs, fingers, flanges, or other similar structures. In the example shown, the connectors 32 comprise a t-tab or t-shaped structure as shown in FIG. 3. Other possible connector shapes include an arrow shape, a bulbous shape, or other similar shapes, for example.

FIG. 2A illustrates the inflatable bladder sheet 28 with a plurality of bladders 42, e.g., expandable cells, and associated tubing 44 that define fluid flow paths to the plurality of bladders 42. In one example, the bladders 42 are used for lumbar or massage purposes. The tubing 44 is associated with a pneumatic connector 46 that is used to connect the bladder sheet 28 to a valve bank 48 that is associated with an air source. An actuator assembly 50 controls inflation of the bladders 42 via the valve bank 48. The actuator assembly 50 may include a compressor or pneumatic pump connected to the valve bank 48 to provide a source of fluid to the bladders 42. A seat control module is associated with the seat assembly 10, and is identified generally as a controller 52. In one example, the controller 52 regulates compressed air into and out of the bladders 42 in the seat assembly 10. The controller 52 and actuator assembly 50 may be installed in the seat back 14, or installed under the seat, or anywhere suitable in the vehicle. Further, the controller 52 and actuator assembly 50 may be one unit or separate units from each other.

The controller 52 may include a processing unit and non-transitory memory for executing various control strategies. The processing unit can be a custom made or commercially available processor, a central processing unit (CPU), or generally any device for executing software instructions. The memory can include any one or combination of volatile memory elements and/or nonvolatile memory elements. The processing unit can be programmed to execute one or more programs stored in the memory. The programs may be stored in the memory as software code, for example. The programs stored in the memory may include one or more additional or separate programs, each of which includes an ordered list of executable instructions for implementing logical functions associated with controlling the valve bank. While shown as a single controller, the 52 may be comprised of one or more controllers. The controller 52 may also be in communication with, and responsive to instructions from, another controller.

Figures 4A, 4B:
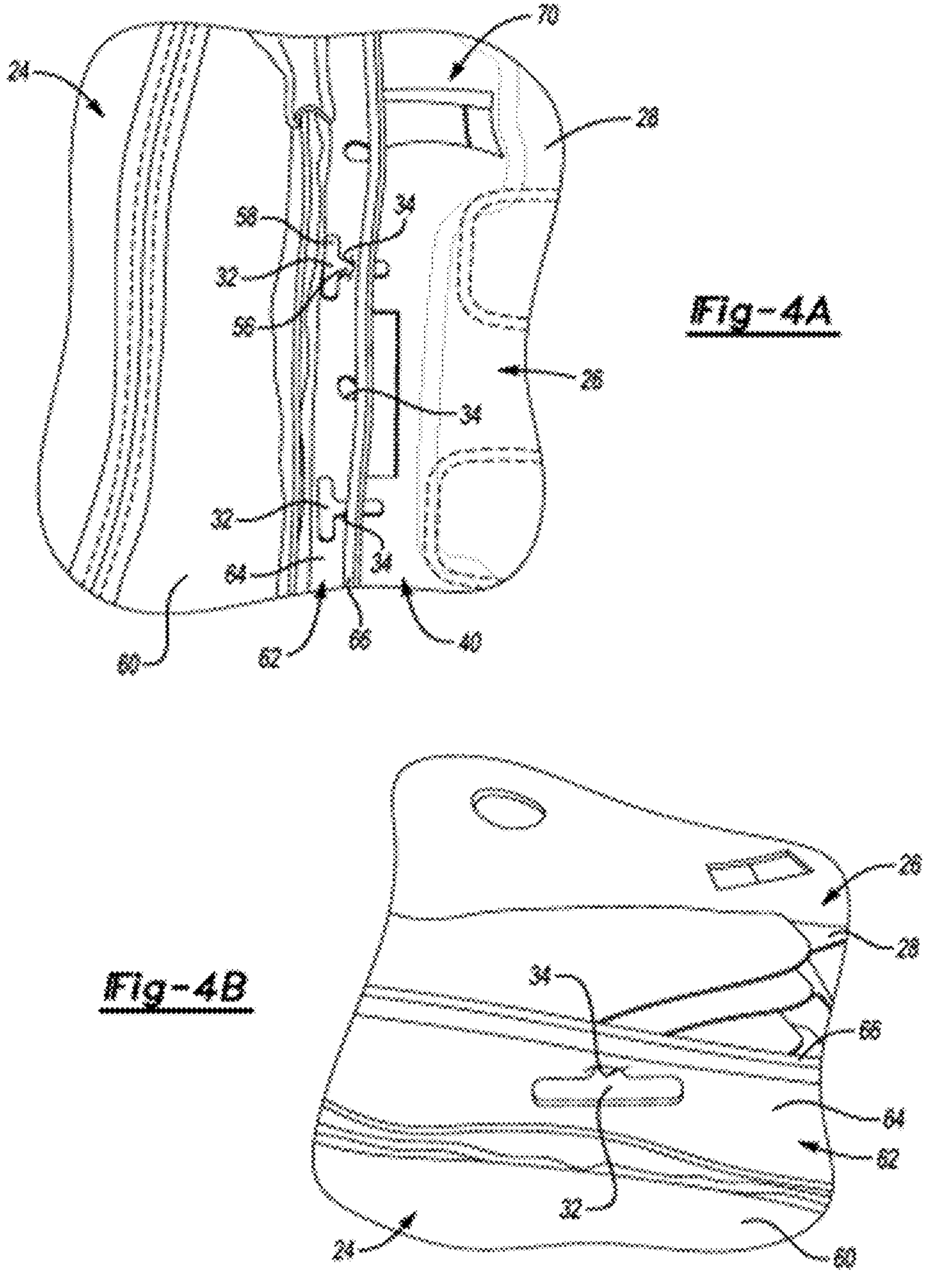
FIG. 4A is perspective view of connectors inserted through apertures in the trim cover.
FIG. 4B is an enlarged view of one connector as inserted through one aperture in the trim cover.

In one example shown in FIGS. 4A-4B, the integrally formed connectors 32 are received within the apertures 34 to secure the comfort system 26 to the trim cover 24 as a unit 40. In one example, the apertures 34 comprise openings, slits, holes, or gaps. In one example, the connectors 32 are spaced apart from each other about an outer peripheral edge 54 of the sheet 28. Each connector 32 comprises a discrete connector body extending outwardly from the periphery 54 and is spaced apart from adjacent connectors 32.

In one example, each connector 32 is elastically deformable, e.g., compressible, from an initial state to a compressed state, e.g., collapsed state. Each compressed connector 32 is inserted, e.g., pushed or pressed, through one corresponding aperture 34 in the trim cover 24. In one example, each compressed connector 32 is also inserted, e.g., pushed or pressed, through one corresponding aperture 33 in the mat 30 that is aligned with the aperture 34 in the trim cover 24. Each compressed connector 32 automatically expands back from the compressed state to the initial state subsequent to being inserted through the aperture 33 and/or 34.

As shown in FIGS. 4A-4B, each connector 32 comprises a t-shape comprising a stem 56 extending from an edge of the sheet 28, with the stem 56 intersecting a cross member 58.

In one example, at least some of the apertures 34 are aligned with connectors 32 prior to assembly. When the apertures 34 and connectors are facing each other, the aligned connectors 32 are compressed and inserted through corresponding aligned apertures 34 to secure the comfort assembly 26 to the trim cover 24.

In one example, the trim cover 24 comprises a material sheet 60 with at least one retainer 62 comprising a first portion 64 securable to the trim cover 24 and a second portion 66 securable to a seat structure, e.g., cushion/foam, frame. In one example, the plurality of apertures 34 are formed within the first portion 64. In one example, the retainer 62 comprises a tie-down having the first portion 64 comprise a material portion with one end associated with the trim cover 24 and an opposite end coupled to the second portion 66, which comprises an elongated body that is configured to connect to a retainer member 68 (FIG. 5B) associated with the cushion 22.

Figures 5A, 5B:
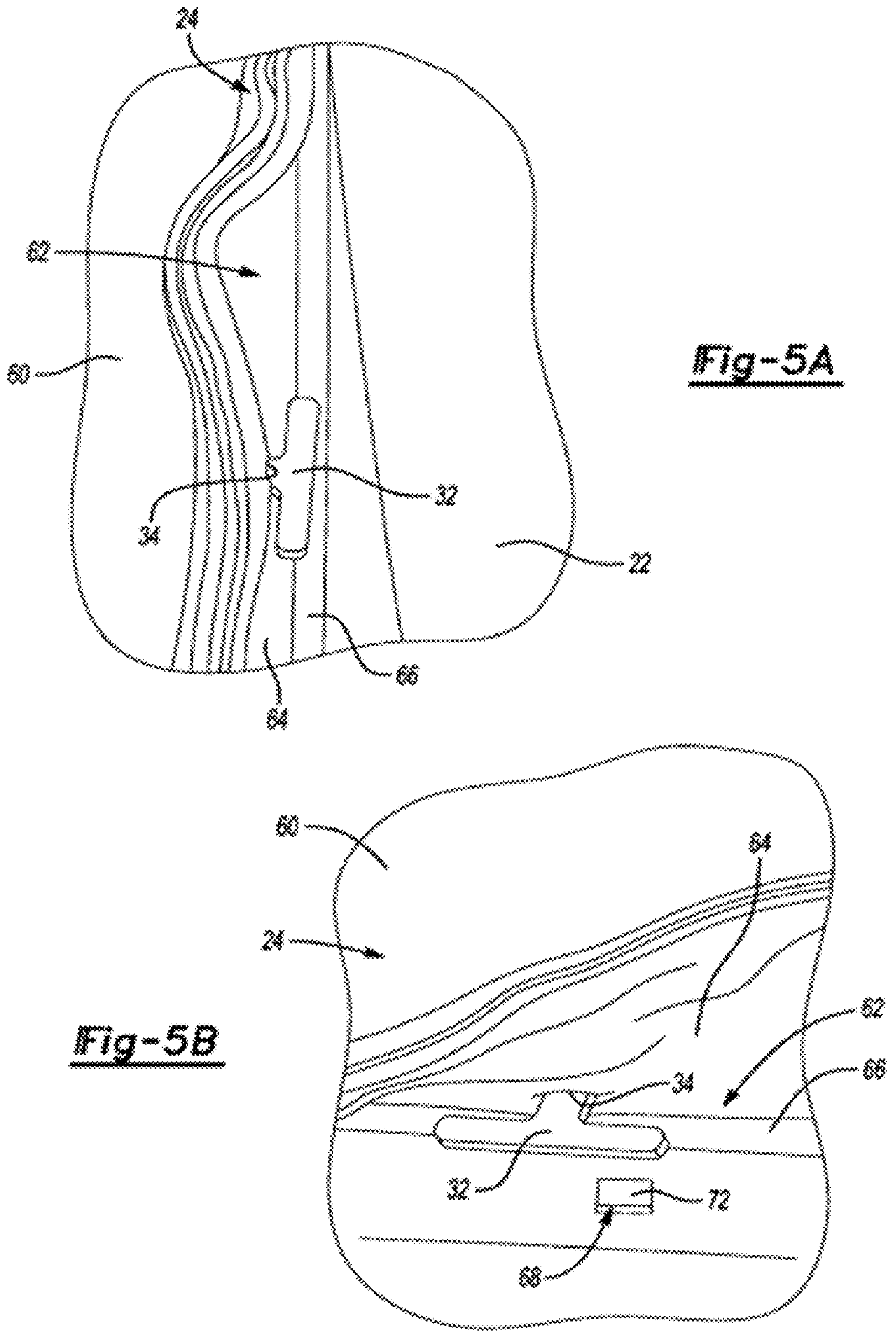
FIG. 5A is a perspective view of an assembly of the trim cover and comfort system in relation to a cushion.
FIG. 5B is the assembly of FIG. 5A as being attached to a retaining structure associated with the cushion.
Figure 6:
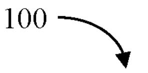
FIG. 6 illustrates a flowchart of a method to attach a comfort system to a trim cover, in accordance with an embodiment of the present disclosure.
Figure 6:
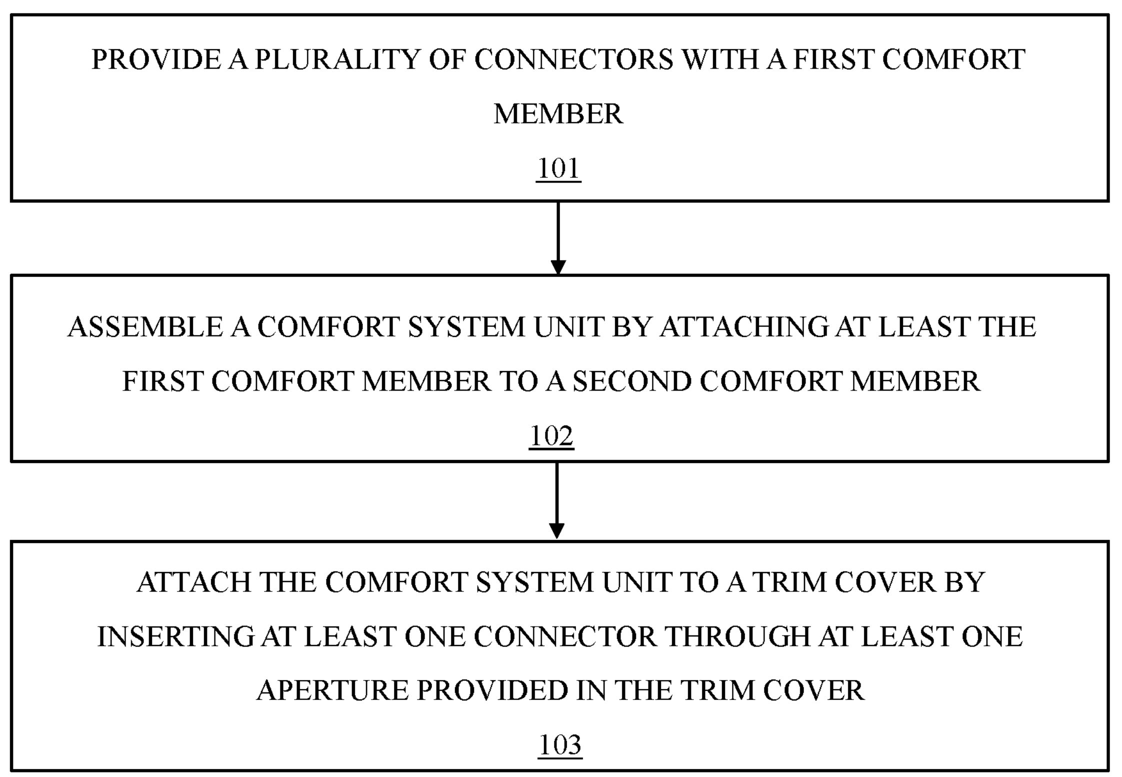

In one example, the unit of the bladder sheet 28 and variable temperature mat 30 comprises a first unit 40, and the first unit 40 is secured to the trim cover 24 to form an assembly that is securable to the seat structure as a second unit 70. In one example, the second unit 70 is securable to the cushion 22 with the retainer 62, e.g. tie-down, as shown in FIGS. 5A-5B. In one example, the second portion 66, e.g., the elongated tubular body, of the retainer 62 secures to a retention clip 72 to hold the second unit 70 in a desired position. It should be understood that the tie-down is just one example of a retainer that can be used to secure the second unit 70 to the cushion 22, and that other seat retainers could also be used. For example, the retainer can have any suitable configuration, such as a male configuration, female configuration, or combinations thereof. As some examples, the retainer may be configured as or may be provided with a hook, hole, barb, linkage, loop, or can comprise a hook and loop fastener such as Velcro®. The retainer can be secured to the trim cover in any suitable manner, such as with stitching, a mechanical fastener, molding, bonding, or an adhesive.

The subject disclosure provides for a method 100 and apparatus to attach a comfort system to a trim cover. The attachment comprises a robust, serviceable trim attachment that does not require additional or separate parts.

In one example, a method 100 comprises: a step 101 comprising integrally forming a plurality of connectors 32 with a first comfort member; a step 102 comprising assembling a comfort system unit by attaching at least the first comfort member to a second comfort member; and a step 103 comprising attaching the comfort system unit to a trim cover by inserting at least one connector through at least one aperture provided in the trim cover.

The method can also include any of the following steps either alone or in any combination. In one example, the comfort system unit comprises a first unit, and the method includes: securing the comfort system unit to the trim cover to form an assembly; and securing the assembly to a seat structure as a second unit. In one example, the seat structure comprises a seat bottom, e.g., a frame or seat cushion/foam base, or a seat back, e.g., a frame or seat cushion/foam base.

In one example, the method includes: forming the first comfort member as a sheet including a plurality of bladders and associated pneumatic circuits defining fluid flow paths the plurality of bladders; integrally forming the plurality of integrally formed connectors as part of the sheet; forming the second comfort member as a variable temperature comfort pad; and attaching the variable temperature comfort pad to the sheet to form the comfort system unit.

In one example, the method includes: spacing the plurality of connectors apart from each other about an outer peripheral edge of the sheet; aligning at least some of the apertures of the plurality of apertures with connectors from the plurality of connectors; elastically deforming each connector from an initial state to a compressed state; and inserting each compressed connector through one aperture of the plurality of apertures in the trim cover, with each compressed connector automatically expanding back from the compressed state to the initial state.

In one example, the method includes: forming the trim cover as a material sheet including at least one retainer that comprises a first portion securable to the trim cover and a second portion securable to a seat structure; and forming the plurality of apertures within the first portion of the at least one retainer.

In one example, an apparatus comprises: a comfort system comprising at least a first comfort member and a second comfort member attached to the first comfort member, wherein at least one of the first comfort member and the second comfort member includes a plurality of integrally formed connectors; and a trim cover including a plurality of apertures, wherein the comfort system is securable to the trim cover as a unit via at least one connector being inserted through at least one aperture.

The apparatus may include any of the following either alone or in any combination. In one example, the first comfort member comprises a sheet including a plurality of bladders and associated pneumatic circuits defining fluid flow paths to the plurality of bladders, and wherein the plurality of integrally formed connectors are formed as part of the sheet; and the second comfort member comprises a variable temperature comfort pad attached to the sheet to form the unit.

In one example, the plurality of integrally formed connectors are spaced apart from each other about an outer peripheral edge of the sheet.

In one example, each connector is elastically deformable from an initial state to a compressed state, and wherein each compressed connector is inserted through one aperture of the plurality of apertures in the trim cover, with each compressed connector automatically expanding back from the compressed state to the initial state.

In one example, each connector comprises a t-shape, an arrow shape or a bulbous shape.

In one example, at least some apertures of the plurality of apertures are aligned with connectors from the plurality of integrally formed connectors, and wherein aligned connectors are inserted through corresponding aligned apertures to secure the sheet to the trim cover.

In one example, the trim cover comprises a material sheet with at least one retainer comprising a first portion securable to the trim cover and a second portion securable to a seat structure, and wherein the plurality of apertures are formed within the first portion.

In one example, the unit comprises a first unit, and wherein the comfort system secured to the trim cover forms an assembly that is securable to a seat structure as a second unit.

In one example a method comprises: integrally forming a plurality of connectors with a first comfort member; assembling a comfort system unit by attaching at least the first comfort member to a second comfort member; and attaching the comfort system unit to a trim cover by inserting at least one connector through at least one aperture provided in the trim cover.

The method may include any of the following either alone or in any combination. In one example, the comfort system unit comprises a first unit, and the method includes: securing the first unit to the trim cover to form an assembly; and securing the assembly to a seat structure as a second unit.

In one example, the method includes: forming the first comfort member as a sheet including a plurality of bladders and associated pneumatic circuits defining fluid flow paths to the plurality of bladders; integrally forming the plurality of connectors as part of the sheet; forming the second comfort member as a variable temperature comfort pad; and attaching the variable temperature comfort pad to the sheet to form the comfort system unit.

In one example, the at least one aperture comprises a plurality of apertures, and the method includes: spacing the plurality of connectors apart from each other about an outer peripheral edge of the sheet; aligning at least some apertures of the plurality of apertures with connectors from the plurality of connectors; elastically deforming each connector from an initial state to a compressed state; and inserting each compressed connector through one aperture of the plurality of apertures in the trim cover, with each compressed connector automatically expanding back from the compressed state to the initial state.

In one example, the at least one aperture comprises a plurality of apertures, and the method includes: forming wherein the trim cover as a material sheet including at least one retainer that comprises a first portion securable to the trim cover and a second portion securable to a seat structure; and forming the plurality of apertures within the first portion of the at least one retainer.

In one example, an apparatus comprises: a sheet including a plurality of bladders and associated pneumatic circuits defining fluid flow paths to the plurality of bladders; a plurality of connectors formed with the sheet; and a trim cover including a plurality of apertures, wherein the sheet is securable to the trim cover via at least one connector being inserted through at least one aperture.

The apparatus may include any of the following either alone or in any combination. In one example, the plurality of connectors integrally formed with sheet and are spaced apart from each other about an outer peripheral edge of the sheet; at least some apertures of the plurality of apertures are aligned with connectors from the plurality of connectors; and each connector is elastically deformable from an initial state to a compressed state, and wherein each compressed connector is inserted through one aperture of the plurality of apertures in the trim cover, with each compressed connector automatically expanding back from the compressed state to the initial state.

In one example, the trim cover comprises a material sheet with at least one retainer comprising a first portion securable to the trim cover and a second portion securable to a seat structure, and wherein the plurality of apertures are formed within the first portion.

In one example, each connector comprises a t-shape, an arrow shape or a bulbous shape.

In one example, a method comprises: providing the sheet, the plurality of connectors, and the trim cover according to that as described above; integrally forming the plurality of connectors with the sheet; elastically deforming at least one connector from an initial state to provide a compressed connector; inserting the compressed connector through one aperture of the plurality of apertures; and securing the sheet to the trim cover in response to the compressed connector automatically expanding to the initial state after insertion.

The method may include any of the following either alone or in any combination. In one example, the method includes: spacing the plurality of connectors apart from each other about an outer peripheral edge of the sheet; aligning at least some apertures of the plurality of apertures with connectors from the plurality of connectors; elastically deforming each connector from the initial state to a compressed state to provide compressed connectors; and inserting each compressed connector through one aperture of the plurality of apertures in the trim cover with each compressed connector automatically expanding back from the compressed state to the initial state.

In one example, the trim cover comprises a material sheet with at least one retainer with a first portion securable to the trim cover and a second portion securable to a seat structure, and the method includes forming the plurality of apertures within the first portion of the at least one retainer.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An apparatus, comprising:

a comfort system comprising at least a first comfort member and a second comfort member attached to the first comfort member, wherein at least one of the first comfort member and the second comfort member comprises a plurality of connectors defined by at least a portion of the first comfort member or the second comfort member; and a trim cover including a plurality of apertures, wherein the comfort system is securable to the trim cover as a unit via at least one connector of the plurality of connectors being inserted through at least one aperture of the plurality of apertures.

2. The apparatus of claim 1, wherein:

the first comfort member comprises a sheet including a plurality of bladders and associated pneumatic circuits defining fluid flow paths to the plurality of bladders, and wherein the plurality of connectors comprises a plurality of integrally formed connectors that are formed as part of the sheet; and the second comfort member comprises a variable temperature comfort pad attached to the sheet to form the unit.

3. The apparatus of claim 2, wherein the plurality of integrally formed connectors are spaced apart from each other about an outer peripheral edge of the sheet.

4. The apparatus of claim 3, wherein each connector is elastically deformable from an initial state to a compressed state, and wherein each compressed connector is inserted through one aperture of the plurality of apertures in the trim cover, with each compressed connector automatically expanding back from the compressed state to the initial state.

5. The apparatus of claim 3, wherein each connector comprises a t-shape, an arrow shape or a bulbous shape.

6. The apparatus of claim 3, wherein at least some apertures of the plurality of apertures are aligned with connectors from the plurality of integrally formed connectors, and wherein aligned connectors are inserted through corresponding aligned apertures to secure the sheet to the trim cover.

7. The apparatus of claim 6, wherein the trim cover comprises a material sheet with at least one retainer comprising a first portion securable to the trim cover and a second portion securable to a seat structure, and wherein the plurality of apertures are formed within the first portion.

8. The apparatus of claim 1, wherein at least one of the first comfort member and the second comfort member includes a second plurality of apertures, and wherein the first comfort member and the second comfort member are securable to each other by inserting the plurality of connectors through the second plurality of apertures.

9. A method, comprising:

providing a plurality of connectors with a first comfort member of a comfort system unit;

assembling the comfort system unit by attaching at least the first comfort member to a second comfort member of the comfort system unit; and attaching the comfort system unit to a trim cover by inserting at least one connector defined by at least of a portion of the first comfort member or the second comfort member through at least one aperture provided in the trim cover.

10. The method of claim 9, wherein the comfort system unit comprises a first unit, and the method including:

securing the first unit to the trim cover to form an assembly; and securing the assembly to a seat structure as a second unit.

11. The method of claim 9, including:

forming the first comfort member as a sheet including a plurality of bladders and associated pneumatic circuits defining fluid flow paths to the plurality of bladders;

integrally forming the plurality of connectors as part of the sheet;

forming the second comfort member as a variable temperature comfort pad; and attaching the variable temperature comfort pad to the sheet to form the comfort system unit.

12. The method of claim 11, wherein the at least one aperture comprises a plurality of apertures, and the method including:

spacing the plurality of connectors apart from each other about an outer peripheral edge of the sheet;

aligning at least some apertures of the plurality of apertures with connectors from the plurality of connectors;

elastically deforming each connector from an initial state to a compressed state; and inserting each compressed connector through one aperture of the plurality of apertures in the trim cover, with each compressed connector automatically expanding back from the compressed state to the initial state.

13. The method of claim 9, wherein the at least one aperture comprises a plurality of apertures, and the method including:

forming wherein the trim cover as a material sheet including at least one retainer that comprises a first portion securable to the trim cover and a second portion securable to a seat structure; and forming the plurality of apertures within the first portion of the at least one retainer.

14. An apparatus, comprising:

a sheet including a plurality of bladders and associated pneumatic circuits defining fluid flow paths to the plurality of bladders;

a plurality of connectors defined by at least a portion of the sheet; and a trim cover including a plurality of apertures, wherein the sheet is securable to the trim cover via at least one connector of the plurality of connectors being inserted through at least one aperture of the plurality of apertures.

15. The apparatus of claim 14, wherein:

the plurality of connectors are integrally formed with sheet and are spaced apart from each other about an outer peripheral edge of the sheet;

at least some apertures of the plurality of apertures are aligned with connectors from the plurality of connectors; and each connector is elastically deformable from an initial state to a compressed state, and wherein each compressed connector is inserted through one aperture of the plurality of apertures in the trim cover, with each compressed connector automatically expanding back from the compressed state to the initial state.

16. The apparatus of claim 15, wherein the trim cover comprises a material sheet with at least one retainer comprising a first portion securable to the trim cover and a second portion securable to a seat structure, and wherein the plurality of apertures are formed within the first portion.

17. The apparatus of claim 14, wherein each connector comprises a t-shape, an arrow shape or a bulbous shape.

18. A method, comprising:

providing the sheet, the plurality of connectors, and the trim cover according to claim 14;

integrally forming the plurality of connectors with the sheet;

elastically deforming at least one connector from an initial state to provide a compressed connector;

inserting the compressed connector through one aperture of the plurality of apertures; and securing the sheet to the trim cover in response to the compressed connector automatically expanding to the initial state after insertion.

19. The method of claim 18, including:

spacing the plurality of connectors apart from each other about an outer peripheral edge of the sheet;

aligning at least some apertures of the plurality of apertures with connectors from the plurality of connectors;

elastically deforming each connector from the initial state to a compressed state to provide compressed connectors; and inserting each compressed connector through one aperture of the plurality of apertures in the trim cover with each compressed connector automatically expanding back from the compressed state to the initial state.

20. The method of claim 18, wherein the trim cover comprises a material sheet with at least one retainer with a first portion securable to the trim cover and a second portion securable to a seat structure, and including forming the plurality of apertures within the first portion of the at least one retainer.

* * * * *